(12) United States Patent
Christoffersson et al.

(10) Patent No.: US 12,476,749 B2
(45) Date of Patent: Nov. 18, 2025

(54) NETWORK NODE, WIRELESS COMMUNICATION DEVICE AND METHODS FOR CONFIGURING SIDE-LINK RESOURCES IN WIRELESS COMMUNICATION NETWORK

(71) Applicant: Telefonaktiebolaget LM Ericsson (publ), Stockholm (SE)

(72) Inventors: Jan Christoffersson, Luleå (SE); Mårten Ericson, Gammelstad (SE); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 321 days.

(21) Appl. No.: 18/259,364

(22) PCT Filed: Jan. 19, 2021

(86) PCT No.: PCT/SE2021/050028
§ 371 (c)(1),
(2) Date: Jun. 26, 2023

(87) PCT Pub. No.: WO2022/159009
PCT Pub. Date: Jul. 28, 2022

(65) Prior Publication Data
US 2024/0063958 A1 Feb. 22, 2024

(51) Int. Cl.
*H04L 5/00* (2006.01)
*H04W 24/10* (2009.01)
(Continued)

(52) U.S. Cl.
CPC .......... *H04L 5/0033* (2013.01); *H04L 5/0048* (2013.01); *H04L 5/0069* (2013.01);
(Continued)

(58) Field of Classification Search
CPC ... H04L 5/0023; H04L 5/0033; H04L 5/0048; H04L 5/0069; H04L 5/0094;
(Continued)

(56) References Cited

U.S. PATENT DOCUMENTS

| 2014/0334435 A1 | 11/2014 | Al-Shalash |
| 2016/0174278 A1 | 6/2016 | Gao et al. |

(Continued)

OTHER PUBLICATIONS

"3GPP TS 38.214 V15.9.0", 3rd Generation Partnership Project; Technical Specification Group Radio Access Network; NR; Physical layer procedures for data (Release 15), Mar. 2020, pp. 1-107.

*Primary Examiner* — Thomas R Cairns
(74) *Attorney, Agent, or Firm* — Murphy, Bilak & Homiller, PLLC

(57) ABSTRACT

A network node, a wireless communication device and methods therein for monitoring interferences between a number of groups of wireless communication devices and configuring SL resources for the number of groups of wireless communication devices in a wireless communication network are disclosed. The network node configures a discovery signal associated with an identity and configures which wireless communication devices in which groups to transmit and/or receive the configured discovery signal. The network node determines whether the number of groups of wireless communication devices (130, 131, 132, 140, 141, 142) are isolated from each other based on a report related to the discovery signal and decides whether or not to reconfigure the SL resources for the number of groups or rearrange the wireless communication devices in the groups based on the determined result on whether the number of groups of wireless communication devices (130, 131, 132, 140, 141, 142) are isolated from each other.

20 Claims, 8 Drawing Sheets

(51) Int. Cl.
*H04W 72/542* (2023.01)
*H04W 76/14* (2018.01)

(52) U.S. Cl.
CPC ........... *H04L 5/0094* (2013.01); *H04W 24/10* (2013.01); *H04W 72/542* (2023.01); *H04W 76/14* (2018.02)

(58) Field of Classification Search
CPC ............. H04L 27/2602; H04W 24/10; H04W 72/542; H04W 76/14; H04W 92/18
See application file for complete search history.

(56) References Cited

U.S. PATENT DOCUMENTS

| | | | |
|---|---|---|---|
| 2016/0323922 A1* | 11/2016 | Park | .................... H04W 72/20 |
| 2016/0338122 A1 | 11/2016 | Tsai et al. | |
| 2019/0140796 A1 | 5/2019 | Wang et al. | |
| 2020/0053544 A1 | 2/2020 | Lindoff et al. | |

\* cited by examiner

NETWORK NODE, WIRELESS COMMUNICATION DEVICE AND METHODS FOR CONFIGURING SIDE-LINK RESOURCES IN WIRELESS COMMUNICATION NETWORK

TECHNICAL FIELD

Embodiments herein relate to side-link resources in a wireless communication network. In particular, they relate to a network node, wireless communication devices and methods for monitoring interference of the side-links and scheduling side-link resources for a number of groups of wireless communication devices in a wireless communication network.

BACKGROUND

A Universal Mobile Telecommunications System (UMTS) is a third generation (3G) telecommunication network, which evolved from the second generation (2G) Global System for Mobile Communications (GSM). Specifications for the Evolved Packet System (EPS), also called a Fourth Generation (4G) network or Long Term Evolution (LTE), have been completed within the 3rd Generation Partnership Project (3GPP) and this work continues in the coming 3GPP releases, for example to specify a Fifth Generation (5G) New Radio (NR) network.

Wireless communication networks, such as GSM networks, LTE networks, 5G NR networks, usually cover a geographical area which is divided into cell areas. Each cell area is served by a base station, which may also be referred as a network node, gNB, eNB, an access node etc. A wireless communication network may include a number of cells that can support communications for a number of wireless communication devices or user equipment (UEs). The terms "wireless communication device" and "UE" may be used interchangeably in the following and the same as the terms "network node", "gNB" and "eNB".

The basic procedure for transmitting up link (UL) data in 4G and 5G systems is dynamic scheduling, where a UE will sends a scheduling request (SR) and/or a buffer status report (BSR) to a gNB to indicate that it has data (SR) and the amount of data (BSR) to transmit. The gNB will then send grant(s) to the UE tailored to the amount and priority of the data. Dynamic scheduling is resource efficient since the grants are tailored for the amount of data the UE has reported. Another option for transmissions is using configured grants (CG) or semi-persistent scheduling (SPS). In this case, the UE is configured with periodical grants. In case the UE has data to send, it may use this configured grant. The benefit of a configured grant is that it may have a short latency if configured with short periodicity, but it lacks the flexibility of dynamic grants. It will also be wasteful with resources if the utilization is low.

Side-link (SL) is a communication mechanism for device to device (D2D) without going through eNB. SL transmissions over NR are specified for 3GPP Rel. 16. These are enhancements of the Proximity-based SErvices (ProSe) specified for LTE. The Proximity based services can be provided when UEs are close to each other. These services comprise: 1) ProSe Direct Discovery. This feature identifies that two UEs are in proximity of each other. For two UEs in cellular coverage it may also be used for commercial purposes. 2) ProSe Direct Communication between two UEs. LTE resources from cellular traffic are reserved and used for this type of communication. 3) Network-level Discovery and Network Support for WLAN Direct Discovery and Communication.

Four new enhancements are particularly introduced to NR SL transmissions as follows:

Support for unicast and groupcast transmissions are added in NR SL. For unicast and groupcast, the physical SL feedback channel (PSFCH) is introduced for a receiving UE to reply the decoding status to a transmitting UE.

Grant-free transmissions, which are adopted in NR uplink transmissions, are also provided in NR SL transmissions, to improve the latency performance.

To alleviate resource collisions among different SL transmissions launched by different UEs, it enhances channel sensing and resource selection procedures, which also lead to a new design of Physical SL Common Control Channel (PSCCH).

To achieve a high connection density, congestion control and thus the QoS management is supported in NR SL transmissions.

To enable the above enhancements, new physical channels and reference signals are introduced in NR:

Physical Side-link Shared Channel (PSSCH): SL version of Physical Downlink Shared Channel (PDSCH). The PSSCH is transmitted by a SL transmitting UE, which conveys SL transmission data, system information blocks (SIBs) for radio resource control (RRC) configuration, and a part of the SL control information (SCI).

Physical SL feedback channel (PSFCH): SL version of Physical Uplink Control Channel (PUCCH). The PSFCH is transmitted by a SL receiving UE for unicast and groupcast, which conveys 1 bit information over 1 RB for the hybrid automatic repeat request (HARQ) acknowledgement (ACK) and the negative ACK (NACK). In addition, channel state information (CSI) is carried in the medium access control (MAC) control element (CE) over the PSSCH instead of the PSFCH.

Physical Side-link Common Control Channel (PSCCH): SL version of Physical Downlink Control Channel (PDCCH). When the traffic to be sent to a receiving UE arrives at a transmitting UE, a transmitting UE should first send the PSCCH, which conveys a part of Side-link Control information (SCI), SL version of Downlink Control information (DCI) to be decoded by any UE for the channel sensing purpose, including the reserved time-frequency resources for transmissions, demodulation reference signal (DMRS) pattern and antenna port, etc.

Side-link Primary/Secondary Synchronization Signal (S-PSS/S-SSS): Similar to downlink transmissions in NR, in SL transmissions, primary and secondary synchronization signals, called S-PSS and S-SSS, respectively, are supported. Through detecting the S-PSS and S-SSS, a UE is able to identify the SL synchronization identity (SSID) from the UE sending the S-PSS/S-SSS. Through detecting the S-PSS/S-SSS, a UE is therefore able to know the characteristics of the UE transmitting the S-PSS/S-SSS. A series of process of acquiring timing and frequency synchronization together with SSIDs of UEs is called initial cell search. Note that the UE sending the S-PSS/S-SSS may not be necessarily involved in SL transmissions, and a node (UE/eNB/gNB) sending the S-PSS/S-SSS is called a synchronization source. There are 2 S-PSS sequences and 336 S-SSS sequences forming a total of 672 SSIDs in a cell.

Physical Side-link Broadcast Channel (PSBCH): The PSBCH is transmitted along with the S-PSS/S-SSS as a synchronization signal/PSBCH block (SSB). The SSB has the same numerology as PSCCH/PSSCH on that carrier, and an SSB should be transmitted within the bandwidth of the configured Bandwidth Parts (BWP). The PSBCH conveys information related to synchronization, such as the direct frame number (DFN), indication of the slot and symbol level time resources for SL transmissions, in-coverage indicator, etc. The SSB is transmitted periodically at every 160 ms.

Demodulation reference signal (DMRS), Phase Tracking Reference Signal (PT-RS), Channel State Information Reference signal (CSIRS): These physical reference signals supported by NR downlink/uplink transmissions are also adopted by SL transmissions. Similarly, the PT-RS is only applicable for Frequency Range 2 (FR2) transmission.

Another new feature is the two-stage Side-link Control Information (SCI). This is a version of the DCI for SL. Unlike the DCI, only part, i.e. first stage, of the SCI is sent on the PSCCH. This part is used for channel sensing purposes including the reserved time-frequency resources for transmissions, demodulation reference signal (DMRS) pattern and antenna port, etc., and can be read by all UEs while the remaining, i.e. second stage, scheduling and control information such as a 8-bits source identity (ID) and a 16-bits destination ID, Network Device Interface (NDI), redundancy version (RV) and HARQ process ID is sent on the PSSCH to be decoded by the receiving UE.

Similar as for ProSE in LTE, NR SL transmissions have the following two modes of resource allocations:

Mode 1: SL resources are scheduled by a gNB.

Mode 2: The UE autonomously selects SL resources from a pre-configured SL resource pool(s) based on the channel sensing mechanism.

For the in-coverage UE, a gNB can be configured to adopt Mode 1 or Mode 2. For the out-of-coverage UE, only Mode 2 can be adopted.

As in LTE, scheduling over the SL in NR is done in different ways for Mode 1 and Mode 2.

Mode 1 supports the following two kinds of grants:

Dynamic grant: When the traffic to be sent over SL arrives at a transmitting UE, this UE should launch the four-message exchange procedure to request SL resources from a gNB, i.e. SR on UL, grant, BSR on UL, grant for data on SL sent to UE. During the resource request procedure, a gNB may allocate a SL radio network temporary identifier (SL-RNTI) to the transmitting UE. If this SL resource request is granted by a gNB, then a gNB indicates the resource allocation for the PSCCH and the PSSCH in the downlink control information (DCI) conveyed by PDCCH with Cyclic Redundancy Check (CRC) scrambled with the SL-RNTI. When a transmitting UE receives such a DCI, a transmitting UE can obtain the grant only if the scrambled CRC of DCI can be successfully solved by the assigned SL-RNTI. A transmitting UE then indicates the time-frequency resources and the transmission scheme of the allocated PSSCH in the PSCCH and launches the PSCCH and the PSSCH on the allocated resources for SL transmissions. When a grant is obtained from a gNB, a transmitting UE can only transmit a single transport block (TB). As a result, this kind of grant is suitable for traffic with a loose latency requirement.

Configured grant: For the traffic with a strict latency requirement, performing the four-message exchange procedure to request SL resources may induce unacceptable latency. In this case, prior to the traffic arrival, a transmitting UE may perform the four-message exchange procedure and request a set of resources. If a grant can be obtained from a gNB, then the requested resources are reserved in a periodic manner. Upon traffic arriving at a transmitting UE, this UE can launch the PSCCH and the PSSCH on the upcoming resource occasion. In fact, this kind of grant is also known as grant-free transmissions.

In both dynamic grant and configured grant, a SL receiving UE cannot receive the DCI since it is addressed to the transmitting UE, and therefore a receiving UE should perform blind decoding to identify the presence of PSCCH and find the resources for the PSSCH through the SCI.

When a transmitting UE launches the PSCCH, CRC is also inserted in the SCI without any scrambling.

In the Mode 2 resource allocation, when traffic arrives at a transmitting UE, this transmitting UE should autonomously select resources for the PSCCH and the PSSCH. To further minimize the latency of the feedback HARQ ACK/NACK transmissions and subsequently retransmissions, a transmitting UE may also reserve resources for PSCCH/PSSCH for retransmissions. To further enhance the probability of successful TB decoding at one shot and thus suppress the probability to perform retransmissions, a transmitting UE may repeat the TB transmission along with the initial TB transmission. This mechanism is also known as blind retransmission. As a result, when traffic arrives at a transmitting UE, then this transmitting UE should select resources for the following transmissions:

1) The PSSCH associated with the PSCCH for initial transmission and blind retransmissions.
2) The PSSCH associated with the PSCCH for retransmissions.

Since each transmitting UE in SL transmissions should autonomously select resources for above transmissions, how to prevent different transmitting UEs from selecting the same resources turns out to be a critical issue in Mode 2. A particular resource selection procedure is therefore imposed to Mode 2 based on channel sensing. The channel sensing algorithm involves measuring Reference Signal Received Power (RSRP) on different subchannels and requires knowledge of the different UEs power levels of DMRS on the PSSCH or the DMRS on the PSCCH depending on the configuration. This information is known only after receiving SCI launched by (all) other UEs. The sensing and selection algorithm are rather complex.

There are D2D discovery procedures for detection of services and applications offered by other UEs in close proximity. This is part of LTE Rel 12 and Rel 13. The discovery procedure has two modes, mode A based on open announcements, i.e. broadcasts, and mode B, which is request and response. The discovery mechanism is controlled by the application layer of ProSe. The discovery message is sent on the Physical Sidelink Discovery Channel (PSDCH) which is not available in NR. Also, there is a specific resource pool for announcement and monitoring of discovery messages. The discovery procedure can be used to detect UEs supporting certain services or applications before initiating direct communication.

In order to assist an LTE base station in providing SL resources, a UE in connected mode i.e. RRC_CONNECTED state, may report geographical location information to the serving eNB. The eNB can configure the UE to report the complete UE geographical location information based on periodic reporting via the existing measurement report signaling. Geographical zones can be configured by the eNB or preconfigured. When zones are (pre-)configured, the area is divided into geographical subdivisions using a single fixed reference point, that is, geographical coordinates (0,0), length and width. The UE determines the zone identity by means of modulo operation using length and width of each zone, number of zones in length, number of zones in width, the single fixed reference point, and the geographical coordinates of the UE's current location. The length and width of each zone, number of zones in length, and number of zones in width are provided by the eNB when the UE is in-coverage, and preconfigured when the UE is out-of-coverage. The zone is configurable for both in-coverage and out-of-coverage. In an in-coverage scenario, when the UE uses autonomous resource selection, the eNB can provide the mapping between zone(s) and Vehicle-to-Everything (V2X) SL transmission resource pools via RRC signaling. For out-of-coverage UEs, the mapping between the zone(s) and V2X SL transmission resource pools can be preconfigured. If the mapping between zone(s) and V2X SL transmission resource pool is (pre-)configured, then the UE selects transmission SL resources from the resource pool corresponding to the zone where it is presently located. The zone concept is not applied to exceptional V2X SL transmission pools as well as reception pools. Resource pools for V2X SL communication are not configured based on priority.

In the following, the term "wireless communication device" is used instead of "UE", and the term "network node" is used instead of "gNB" and "eNB".

SUMMARY

As part of developing embodiments herein a problem was identified and will first be discussed.

SL transmissions, when compared to normal cellular transmissions have very limited reach or coverage. This means that within a cell, there may be several wireless communication devices, or groups of the wireless communication devices who cannot communicate with each other using SL. However, the SL coverage of a specific wireless communication device within the cell is not known to the network node, and hence the network node cannot take the wireless communication devices' SL coverage into account when configuring the SL resources within the cell. This may lead to considerable waste of resources since different wireless communication devices or wireless communication device groups typically will be configured on different sets of resources even though the respective groups will not interfere each other.

Therefore, it is an object of embodiments herein to provide an improved method for monitoring interferences between a number of groups of wireless communication devices and configuring SL resources for the number of groups of wireless communication devices in a wireless communication network.

According to one aspect of embodiments herein, the object is achieved by a method performed in a network node for configuring SL resources in a wireless communication network. The wireless communication network comprises a number of groups of wireless communication devices established by Proximity-based Services in a cell served by the network node. Each group of the wireless communication devices is configured by the network node with a different set of SL resources. The network node configures a discovery signal associated with an identity and configures which wireless communication devices in the number of groups to transmit and/or receiving the configured discovery signal.

The network node then determines whether the number of groups of wireless communication devices are isolated from each other based on a report related to the discovery signal. The network node decides whether to act according to the following Options 1 to 3 based on the determined result on whether the number of groups of wireless communication devices are isolated from each other:

Option 1: The network node reconfigures the number of groups of the wireless communication devices with a same set of SL resources if it is determined that the number of groups of wireless communication devices are isolated from each other.

Option 2: The network node configures the number of groups of the wireless communication devices with different sets of SL resources, if it is determined that the number of groups of wireless communication devices are not isolated from each other.

Option 3: The network node rearranges the wireless communication devices in the number of groups of wireless communication devices if it is determined that the number of groups of wireless communication devices are not isolated from each other.

According to one aspect of embodiments herein, the object is achieved by a network node configured to perform the method for configuring SL resources in a wireless communication network described above.

According to one aspect of embodiments herein, the object is achieved by a method performed in a wireless communication device for monitoring interferences between a number of groups of wireless communication devices in a wireless communication network. The number of groups of wireless communication devices is established by Proximity-based Services in a cell served by a network node. Each group of the wireless communication devices is configured by the network node with a different set of SL resources.

The wireless communication device receives from the network node, information on a configuration of a discovery signal. The configuration of the discovery signal comprises time and frequency locations of the discovery signal and an identity of the discovery signal. The identity of the discovery signal includes any one of a group identity, an identity of a wireless communication device in a group, or an identity linked to the time and frequency locations of the discovery signal.

The wireless communication device receives an instruction from the network node.

The instruction comprises which wireless communication devices in which group to transmit and/or when to receive the discovery signal.

The wireless communication device transmits and/or receives the discovery signal based on the received instruction.

In case the wireless communication device is instructed to receive the discovery signal, the wireless communication device measures a signal strength of the discovery signals transmitted by the wireless communication devices in other groups and decides whether to send a report related to the discovery signal based on the measured signal strength of the discovery signal.

According to one aspect of embodiments herein, the object is achieved by a wireless communication device configured to perform the method for monitoring interferences between a number of groups of wireless communication devices in a wireless communication network described above. In other words, according to the embodiments herein, the network node configures one or more discovery signals each associated with an identity, and the identity include any one of a group identity, an identity of a wireless communication device in a group, or an identity linked to the time and frequency locations of the discovery signal. The network node configures the wireless communication devices belonging to a group to transmit the discovery signals and the wireless communication devices belonging to other groups to monitor for the discovery signals. In case a wireless communication device in a group detects discovery signals from the wireless communication devices belonging to other groups, i.e. the wireless communication device receives a discovery signal transmitted from a wireless communication device belonging to other groups and the received discovery signal strength is above a predefined threshold, it reports this to the network node. The network node will then keep the configuration of these groups on different sets of SL resources. In case two or more groups do not detect discovery signals from each other, then these groups are considered being isolated from each other, the network node can configure these groups on the same set of SL resources and hereby minimize the resources used for SL transmissions in the cell. In this way, the SL resources can be configured in a more resource efficient way by reusing the same time and frequency resources for SL transmissions for isolated groups within the same cell.

Therefore, embodiments herein provide improved methods and apparatus for monitoring interferences between a number of groups of wireless communication devices and configuring SL resources for the wireless communication devices in a wireless communication network.

BRIEF DESCRIPTION OF THE DRAWINGS

Examples of embodiments herein are described in more detail with reference to attached drawings in which.

DETAILED DESCRIPTION

As a part of developing embodiments herein some problems or limitations associated with the existing solutions will be further identified and discussed.

When a ProSe group is established, the SL resources are assigned to the group. This may cause a large number of SL resources to be reserved which cannot be used by other transmissions e.g., other non-group related SL retransmissions, or cellular transmissions since cellular transmission and SL transmissions may not share the same frequency resources.

Figure 1:
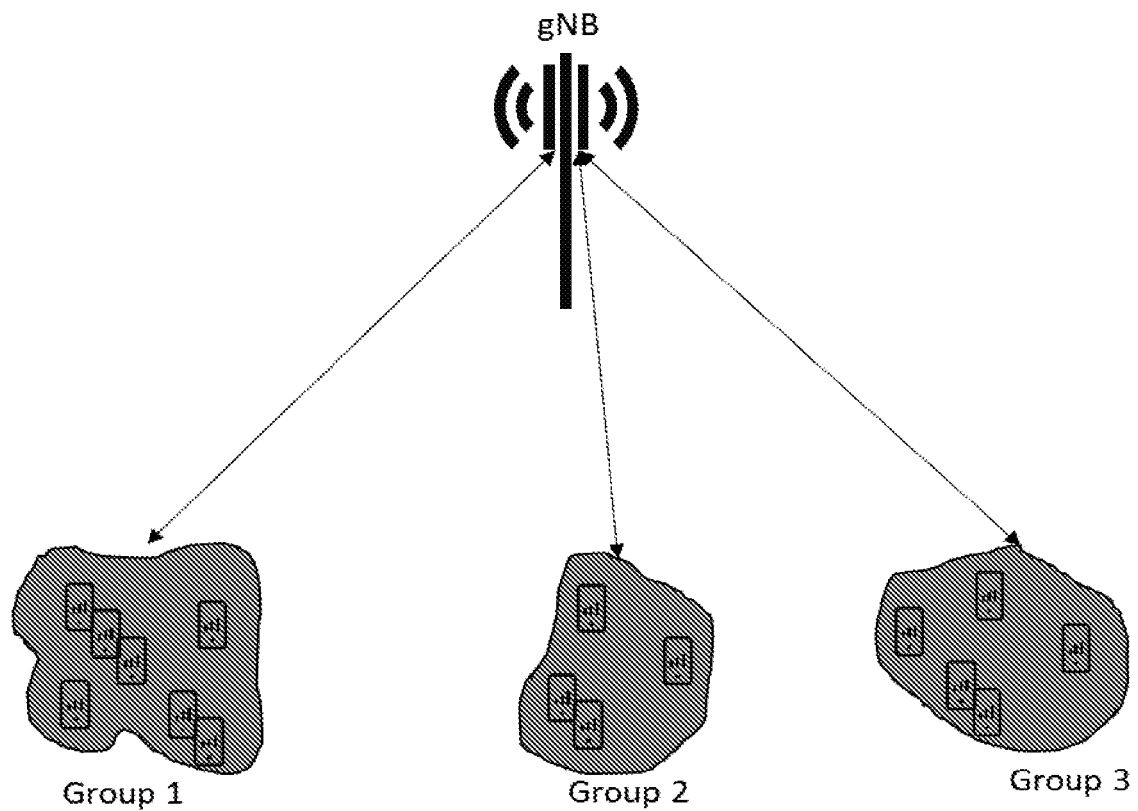
FIG. 1 is a schematic block diagram depicting an example of SL groups that are geographically separated.

FIG. 1 shows an example of SL groups of wireless communication devices that are geographically separated. Using different SL resources for groups 1, 2, and 3 may be a waste of resources since the groups may not interfere with each other.

Figure 2:
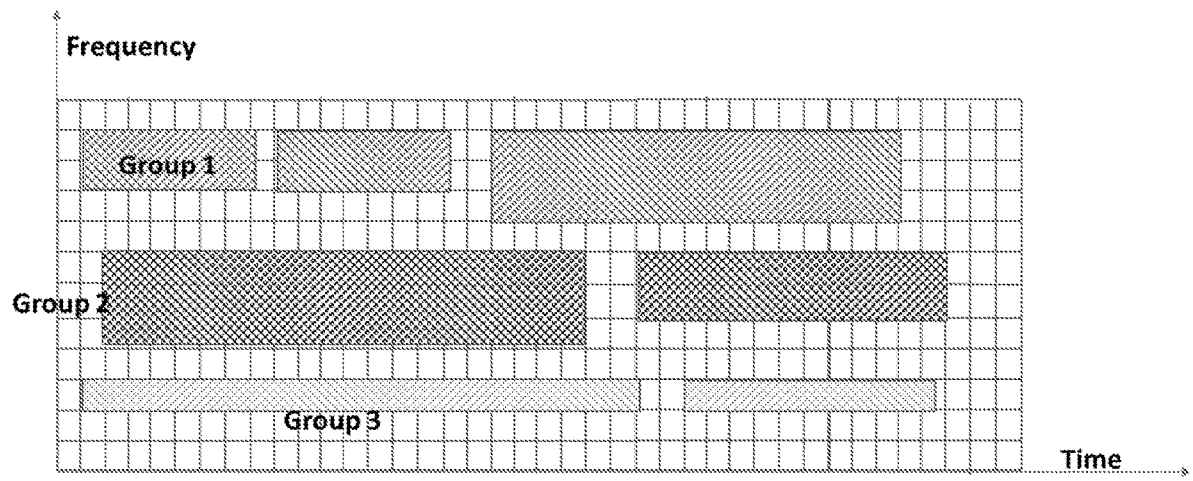
FIG. 2 is a diagram illustrating an example of inefficient SL resource assignment to SL groups.

FIG. 2 shows an example of possible inefficient SL resource assignment to groups 1, 2 and 3 of wireless communication devices, since the groups may be enough separated in space to not interfere with each other.

However, in the targeted scenario where sets of geographically separated wireless communication devices form groups, as shown in FIG. 2, more efficient configurations may be possible if different isolated groups can reuse the same SL resources. However, currently there is no efficient mechanism to achieve this.

As described in the background above, there is a possibility for of wireless communication devices to indicate their geographical location, e.g. by using Global Positioning System (GPS). The mechanism is based on a defined grid and requires all wireless communication devices to report their locations leading to a high amount of signaling. It also requires the wireless communication devices to be in connected mode. Further, a disadvantage with this approach is that the geographical position does not necessarily say very much about the interference two wireless communication devices are causing each other over the SL. For example, a group of wireless communication devices may be located indoors and may not cause interference to other neighboring wireless communication devices although they are close to each other.

If the wireless communication devices in one group cannot be detected by the wireless communication devices belonging in another group, i.e. the distance between any two groups is beyond the SL communication range, e.g., from tens meters to hundreds meters, then the three groups could be configured on the same SL resources by the network node, if the network node has the knowledge that the SL transmission in any of the groups cannot be heard by the other groups. This would enable a large saving of configured SL resources in the cell.

Figure 3:
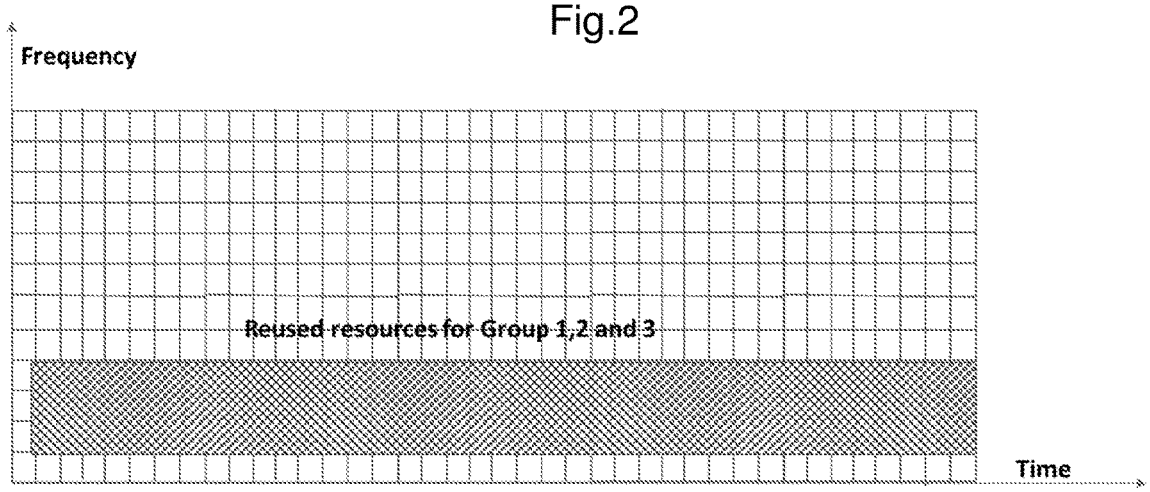
FIG. 3 is a diagram illustrating an example of a proposed configuration with shared SL resources between groups according to embodiments herein.

If it is possible to know that the wireless communication device groups are isolated, it may be possible to configure the SL of the different groups on the same time and frequency resources. This is illustrated in FIG. 3, where all three groups of the wireless communication devices use the same SL resources with the same set of time and frequency resources.

However, as mentioned above there is no efficient method for the network node to detect if the groups are isolated and therefore can be configured with the same SL resources. There may be several difficulties for the network node to detect if there are any overlapping SL transmissions in time between any two groups by the network node itself. For example:

There is no signal that is well designed or usable for detection of unknown wireless communication devices.

There is no reporting mechanism of which wireless communication devices that can be heard by other wireless communication devices.

Any wireless communication devices in a group may move randomly. Even though the network node may have a good picture of a group topology initially when the group was established, after a while the group topology may change drastically due to wireless communication device's mobility. Further, even if a geographically based mechanism is used, moving wireless communication devices will cause a significant signaling due to the wireless communication device's movement even if no change in terms of isolation has occurred.

There is no wireless communication device reporting mechanism on group SL transmission status and group topology status or wireless communication device location status.

According to embodiments herein, a reporting mechanism to report interfering wireless communication devices not belonging to a group is provided. The method may be based on the current S-PSS/S-SSS using a group ID or be based on a discovery signal associated with a group ID configured according to embodiments herein. That is the network node configures a discovery signal associated with a group ID and configures which wireless communication devices in the number of groups to transmit and/or when to receive and detect the configured discovery signal. If the detected discovery signal strength from another group is above a predefined threshold, the wireless communication device utilizes the reporting mechanism according embodiments herein to report to a network node, such as a gNB, either directly or via a coordinating wireless communication device. The network node determines if two or more groups are isolated, i.e. based on if the signal strength of the detected discovery signal is above a threshold. If the groups are isolated, the network node may configure the groups on the same SL resources.

With the term "configuring" or "configure" used herein, it typically means when the network node sends a dedicated RRC message to one or more wireless communication devices and the RRC message contains information on how the wireless communication shall behave. In the case of configuring SL resources, it means that the network node sends information on when and in which frequency the wireless communication is able to transmit data over the SL to other wireless communication devices. In other aspects of this application, it may also means that the network node sends instructions or information on how and when the wireless communication devices shall transmit the discovery signal, how and when the wireless communication devices shall listen for the discovery signal, and how the wireless communication devices shall respond to the discovery signal. The configuration may also be done via system information that are broadcasted in the cell to all wireless communication devices or with dedicated RRC message to specific wireless communication devices.

Figure 4:
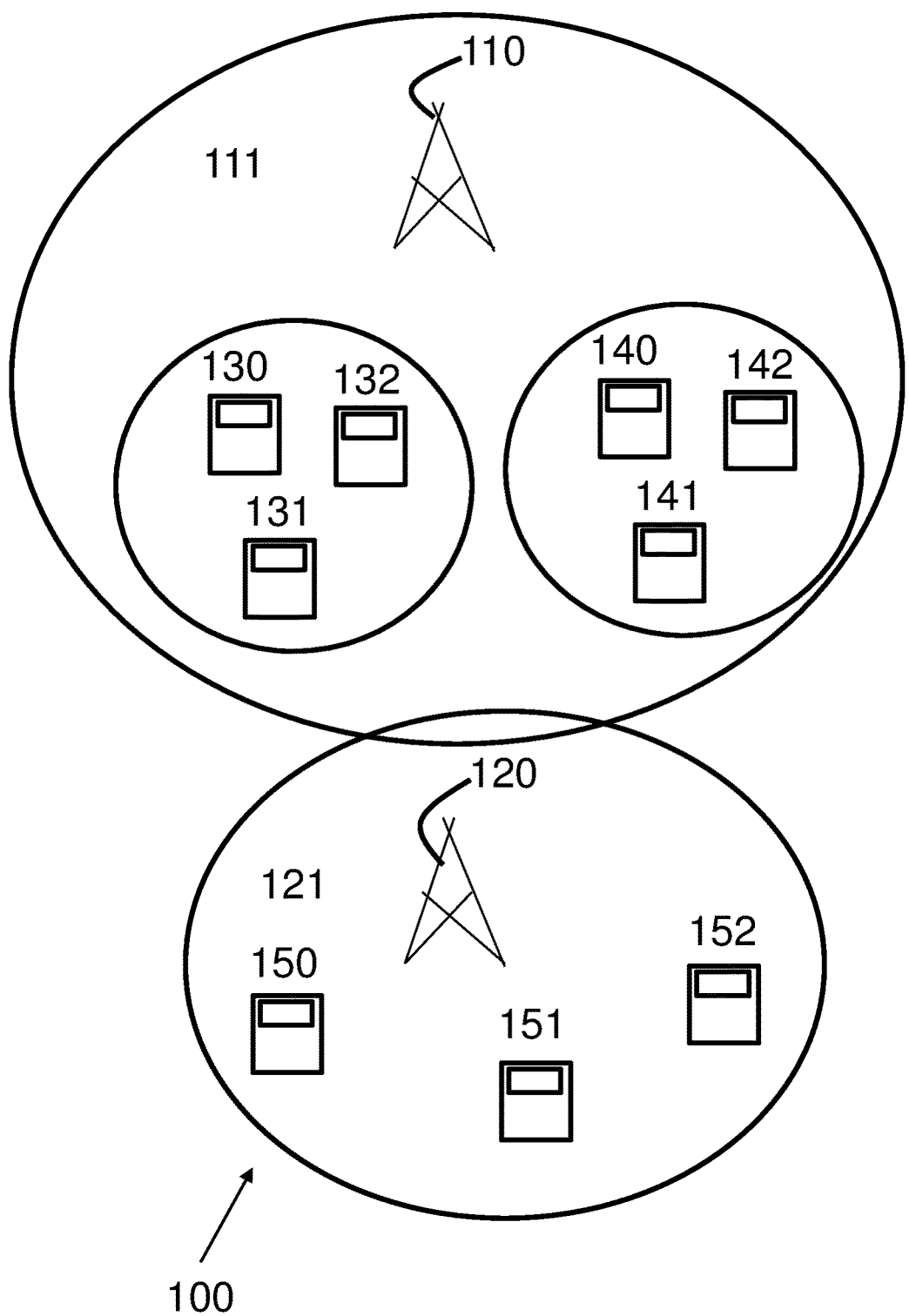
FIG. 4 is a schematic block diagram depicting a wireless communication network in which a method for configuring and scheduling SL resources may be implemented.

FIG. 4 illustrates a wireless communication network 100, in which a method for configuring and scheduling SL resources may be implemented. The wireless communication network 100 comprises a number of network nodes 110, 120, each network node covers an area or a cell, e.g. a service cell 111 covered by the network node 110, a service cell 121 covered by the network node 120. A number of wireless communication devices 130, 131, 132, 140, 141, 142, 150, 151, 152 operate in the wireless communication network 100. A number of groups of wireless communication devices may be established by Proximity-based Services (ProSe) in a cell served by a network node. Each group of wireless communication devices comprises a set of the wireless communication devices. For example, a first group comprises the wireless communication devices 130, 131, 132, a second group comprises the wireless communication devices 140, 141, 142, and the first and second groups may be established by the ProSe in the service cell 111 served by the network node 110. The set of the wireless communication devices in each group is different, thus the number of groups of wireless communication devices is also referred as different groups of wireless communication devices. Each group of the wireless communication devices is configured by the network node with a different set of SL resources when established. Each group may contain a wireless communication device that is refereed as a coordinator.

Figure 5:
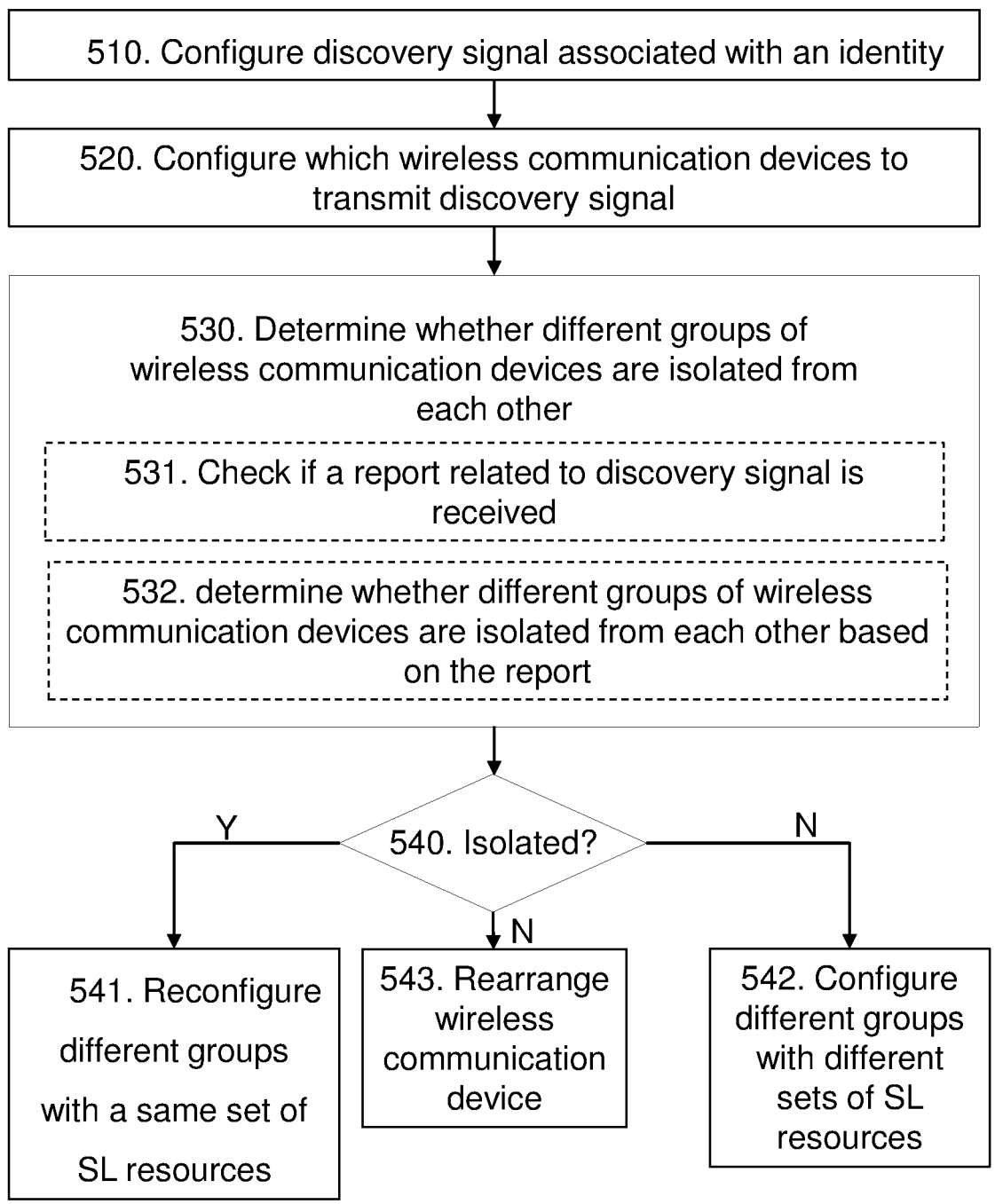
FIG. 5 is a flow chart illustrating a method performed in a network node according to embodiments herein.

A method performed in a network node, e.g. the network node 110, 120, for configuring SL resources in the wireless communication network 100 according to embodiments herein will be described in detail with reference to FIG. 5. The method comprises the following actions which may be performed in any suitable order.

Action 510

The network node 110, 120 configures a discovery signal associated with an identity. A discovery signal when used herein may e.g. be a signal designed or usable for detection of a wireless communication device. The discovery signal will e.g. be used for the wireless communication devices 130, 131, 132, 140, 141, 142 in different groups to detect each other or for detection of other unknown wireless communication devices not belonging to any of the established groups. The network node 110, 120 may configure the discovery signal by e.g. assigning or allocating transmission resource blocks or symbols, i.e. transmission time and frequency resources, for the discovery signal. One or more discovery signals may be configured, each associated with an identity for distinguishing or identifying each of the discovery signals. The identity may include any one of a group identity, an identity of a wireless communication device in a group, or an identity linked to the time and frequency locations of the discovery signal. This is e.g. to enable distinguishing which wireless communication device in which group has transmitted the discovery signal and been detected by other wireless communication device.

Figure 6:
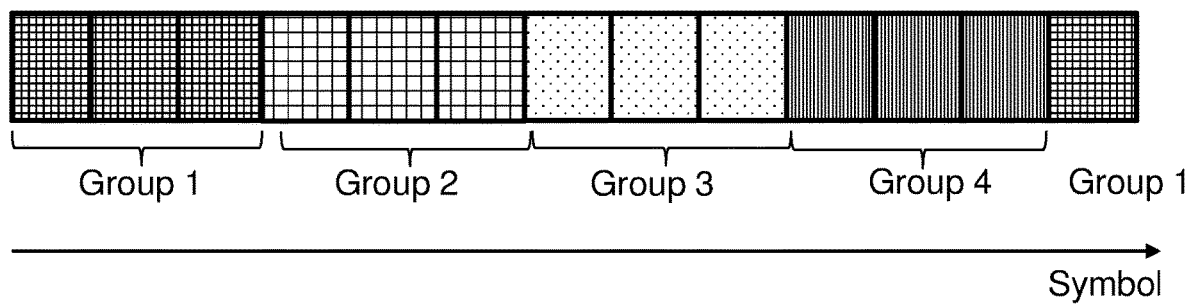
FIG. 6 is a schematic block diagram depicting a new group-based discovery signal on special frequency resource block according to embodiments herein.

The discovery signal associated with an identity may e.g. be configured by any of the following ways:

a) Configuring the S-PSS or S-SSS with a group identity as a discovery signal. The network node 110, 120 may configure the wireless communication devices 130, 131, 132, 140, 141, 142 with a group ID to use and also with a timing and power scheme for the discovery signal transmissions.

b) Configuring a discovery signal with an unique or specific resource block (RB) for each group, wherein a group identity may be represented by any one of a time-shift of the discovery signal, a frequency of the discovery signal or a frequency-shift of the discovery signal. For example, the network node 110, 120 may configure a group-based discovery signal on a specific frequency RB. The discovery may be done with some time interval and on the specific frequency RB (subcarrier). Each group may transmit the discovery signal for M symbols and the discovery signals are time-shifted with M symbols for each group in the cell. This means group 1 can send a discovery signal in M symbols and all other groups listen, then group 2 sends the discovery signal for M symbols etc. This is illustrated in FIG. 6, where the configurations for the discovery signals for four groups of the wireless communication devices Group 1, Group 2, Group 3 and Group 4 are shown, and in which symbol or time to transmit the discovery signal is decided by the group number. The group ID is in this case the time-shift of the discovery signal which may be used by the groups to detect which group it can hear.

c) Configuring the SL control information, SCI, signal as a discovery signal, wherein a source identity of the SCI signal represents a group identity.

The time and frequency locations of the discovery signal must be known by one or more or all wireless communication devices 130, 131, 132, 140, 141, 142 in the different groups. For example, the network node 110, 120 may send or broadcast the information on the time and frequency locations of the discovery signal to the wireless communication devices. The network node 110, 120 may also send a dedicated RRC message with the information on the time and frequency locations of the discovery signal to each concerned wireless communication device.

Action 520

The network node 110, 120 configures which wireless communication devices 130, 131, 132, 140, 141, 142 in which groups shall transmit and/or receive the discovery signal. This is to determine if the different groups are isolated from each other or can hear each other. For example, the network node 110, 120 may send an instruction to indicate that the wireless communication devices 130, 131, 132, belonging to a first group to transmit the discovery signal and the wireless communication devices 140, 141, 142 belonging to other groups to monitor for the discovery signals. Note that a wireless communication device may both transmit the discovery signal of the group it belongs to and at the same time monitor the discovery signals transmitted by the wireless communication devices from any other groups.

The number of groups are known to the network node 110, 120, i.e. the network node 110, 120 knows which wireless communication devices 130, 131, 132, 140, 141, 142 that belong to which group. Therefore, the network node 110, 120 may send the configurations on which wireless communication devices in which group to transmit and/or when to receive the discovery signal to all wireless communication devices in a specific group or just one or more wireless communication devices in a specific group. The network node 110, 120 may also send the configurations to all groups in the cell and configure which wireless communication device to transmit the discovery signal based on e.g. the group numbers, e.g. group 1 transmit at time 1, group 2 at time 2 at a certain frequency etc. The network node 110, 120 may also broadcast the configurations on which wireless communication devices in which groups to transmit and/or when to receive the discovery signal.

There are several alternatives to configure which wireless communication devices 130, 131, 132, 140, 141, 142 in the different groups to transmit the discovery signal such as e.g.:

a) Configuring all the wireless communication devices in a group to transmit the discovery signal, e.g. the wireless communication devices 130, 131, 132 to transmit the discovery signal;

b) Configuring a subset of the wireless communication devices in a group to transmit the discovery signal, e.g. the wireless communication devices 130, 131 to transmit the discovery signal;

c) Configuring a single wireless communication device in a group, e.g. a coordinator wireless communication device 130 in the group, to transmit the discovery signal. In case the locations of the wireless communication devices 130, 131, 132, 140, 141, 142 are known to the network node 110, 120, the selection of the wireless communication device 130, 131, 132, 140, 141, 142 to transmit the discovery signal may be based on the location.

Action 530

The network node 110, 120 needs to identify if any of the groups of wireless communication devices 130, 131, 132, 140, 141, 142 are isolated from each other. If they are, they may be reconfigured with a same set of SL resources and thereby minimize the resources used for SL transmissions in the cell. This is only possible if the groups are isolated from each other since otherwise they will interfere each other. Groups which are isolated from each other when used herein may e.g. mean that groups do not cause interference to each other when the wireless communication devices in different groups transmitting and receiving using SL resources or the wireless communication devices in different groups hear each other but have a low utilization of the SL resources. For example, groups are geographically separate, or groups are separated enough in space to not interfere with each other, or a group of wireless communication devices may be located indoors and may not cause interference to other neighbouring wireless communication devices although they are close to each other.

The network node 110, 120 thus determines if the number of groups of wireless communication devices 130, 131, 132, 140, 141, 142 are isolated from each other based on a report related to the discovery signal.

The network node 110, 120 may configure a received signal strength threshold for the wireless communication devices so that the wireless communication devices 130, 131, 132, 140, 141, 142 only send a report when the received signal strength on the discovery signal measured by the wireless communication devices 130, 131, 132, 140, 141, 142 is above the received signal strength threshold configured by the network node 110, 120.

According to some embodiments herein, the wireless communication devices 130, 131, 132, 140, 141, 142 may not send any report related to the discovery signal, if the wireless communication devices 130, 131, 132, in one group do not detect any discovery signal transmitted from the wireless communication devices 140, 141, 142 in another group.

According to some embodiments herein, the wireless communication devices 130, 131, 132, 140, 141, 142 may not send any report related to the discovery signal if the received signal strength on the discovery signal measured by the wireless communication devices 130, 131, 132, 140, 141, 142 fulfils a condition, e.g. is below the received signal strength threshold configured by the network node 110, 120.

According to some embodiments herein, the wireless communication devices 130, 131, 132, 140, 141, 142 may send a report to indicate that they do not detect any discovery signal. That is if the received signal strength on the discovery signal measured by the wireless communication devices 130, 131, 132, 140, 141, 142 is below the received signal strength threshold configured by the network node, or if the wireless communication devices 130, 131, 132, 140, 141, 142 do not detect any discovery signal at all, then the wireless communication devices may send a report to the network node 110, 120 to indicate this.

According to some embodiments herein, the wireless communication devices 130, 131, 132, 140, 141, 142 may send a report on the received signal strength on the discovery signal to the network node 110, 120.

According to some embodiments herein, the Action 530 of determining if the different groups of wireless communication devices 130, 131, 132, 140, 141, 142 are isolated from each other based on a report related to the discovery signal may be performed by the following actions:

Action 531

The network node 110, 120 checks if a report related to the discovery signal is received from any of the wireless communication devices 130, 131, 132, 140, 141, 142 in the different groups.

Action 532

The network node 110, 120 determines that the number of groups of wireless communication devices 130, 131, 132, 140, 141, 142 are isolated from each other if any one of the following conditions is fulfilled depending on the different reporting sceneries:

- If no report is received from any of the wireless communication devices 130, 131, 132, 140, 141, 142 in the different groups within a time period. The time period may be predefined or configured by the network node 110, 120.
- If a report is received from one or more wireless communication devices 130, 131, 132, 140, 141, 142, and the received reports indicates that the wireless communication devices in the different groups do not detect the discovery signal.
- If a report on the received signal strength on the discovery signal is received from one or more wireless communication devices 130, 131, 132, 140, 141, 142 and the received reports indicate that the received signal strength on the discovery signal fulfil a condition. That is all the reported received signal strength on the discovery signal are below the received signal strength threshold configured by the network node 110, 120.

According to some embodiments herein, a wireless communication device in each group may be identified as a coordinator. The wireless communication devices 130, 131, 132, 140, 141, 142 in each group may send their reports to the coordinator for further transmission to the network node 110, 120 and the network node 110, 120 receives the reports from the coordinator.

According to some embodiments herein, the report may comprise detected group identity and in which frequency the detected discovery signal is.

According to some embodiments herein, the report is an aggregated report by aggregating reports from all or some of the wireless communication devices 130, 131, 132, 140, 141, 142 within a group by the coordinator before transmitting to the network node 110, 120.

The network node 110, 120 may further configure a time period for the wireless communication devices 130, 131, 132, 140, 141, 142 to average the SL resources usage and the detected discovery signal strength over the configured time period and send a report to the network node 110, 120 or to the coordinator after the configured time period.

According to some embodiments herein, the network node 110, 120 may receive the reports via Radio Resource Control (RRC) or based on Media Access Control (MAC) Control Element signaling, from all or some of the wireless communication devices 130, 131, 132, 140, 141, 142 or from the coordinator wireless communication devices in a group.

Action 540

The network node 110, 120 decides whether to act according to Option 1, Option 2 or Option 3 based on whether the number of groups of wireless communication devices 130, 131, 132, 140, 141, 142 are isolated from each other or not.

Option 1 comprises reconfiguring 541 the number of groups of the wireless communication devices 130, 131, 132, 140, 141, 142 with a same set of SL resources if it is determined that the number of groups of wireless communication devices are isolated from each other;

Option 2 comprises configuring 542 the number of groups of the wireless communication devices 130, 131, 132, 140, 141, 142 with different sets of SL resources, if it is determined that the number of groups of wireless communication devices are not isolated from each other;

Option 3 comprises rearranging 543 the wireless communication devices 130, 131, 132, 140, 141, 142 in the number of groups if it is determined that the number of groups of wireless communication devices are not isolated from each other.

Therefore, according to some embodiments herein, the Option 2 is when the network node 110, 120 has determined that the number of groups of wireless communication devices 130, 131, 132, 140, 141, 142 are not isolated from each other. For example, if a report is received indicating that a wireless communication device 131 in the first group detects a discovery signal transmitted by a wireless communication device 141 in the second group, then the different sets of SL resources configured for the first and second groups of the wireless communication devices 130, 131, 132, 140, 141, 142 when the two groups are established, may be maintained to ensure that the first group and the second group have separate configurations of their SL resources.

According to some embodiments herein, the Option 3 is also when the network node 110, 120 has determined that the number of groups of wireless communication devices 130, 131, 132, 140, 141, 142 are not isolated from each other. For example, the discovery signal of a wireless communication device 130, 131, 132 in a group, e.g. the first group, is detected by any of the wireless communication devices 140, 141, 142 in another group, e.g. the second group, then that interfere wireless communication device may be removed or dropped from its group, i.e. the first group it belongs to, or reallocated or reassigned to other group, e.g. a third group. That is the network node 110, 120 may rearrange the wireless communication devices (130, 131, 132, 140, 141, 142) in the number of groups in the following ways, e.g.:

The network node 110, 120 may remove a wireless communication device from its group if the discovery signal transmitted by this wireless communication device is detected by any of the wireless communication devices in other groups.

The network node 110, 120 may reallocate a wireless communication device in a first group to a third group if the discovery signal transmitted by this wireless communication device is detected by any of the wireless communication devices in a second group.

According to some embodiments herein, the network node 110, 120 may configure the wireless communication devices 130, 131, 132, 140, 141, 142 to transmit the discovery signal before each usage of the SL resources. For example, the specific group-based discovery signal may only be transmitted before the SL resources are utilized by any of the wireless communication devices 130, 131, 132, 140, 141, 142 in the group. This means that a group that has high utilization of the SL resource will send the discovery signal very often and a group that has low utilization will transmit the discovery signal very seldom. In this way the traffic load on another group's SL may be estimated and be used to determine if the SL resources could be shared. That is, if e.g. two groups hear each other but have a low utilization of the SL, the groups will be able to share the same SL without degraded performance since the probability of colliding transmissions is low.

Figure 7:
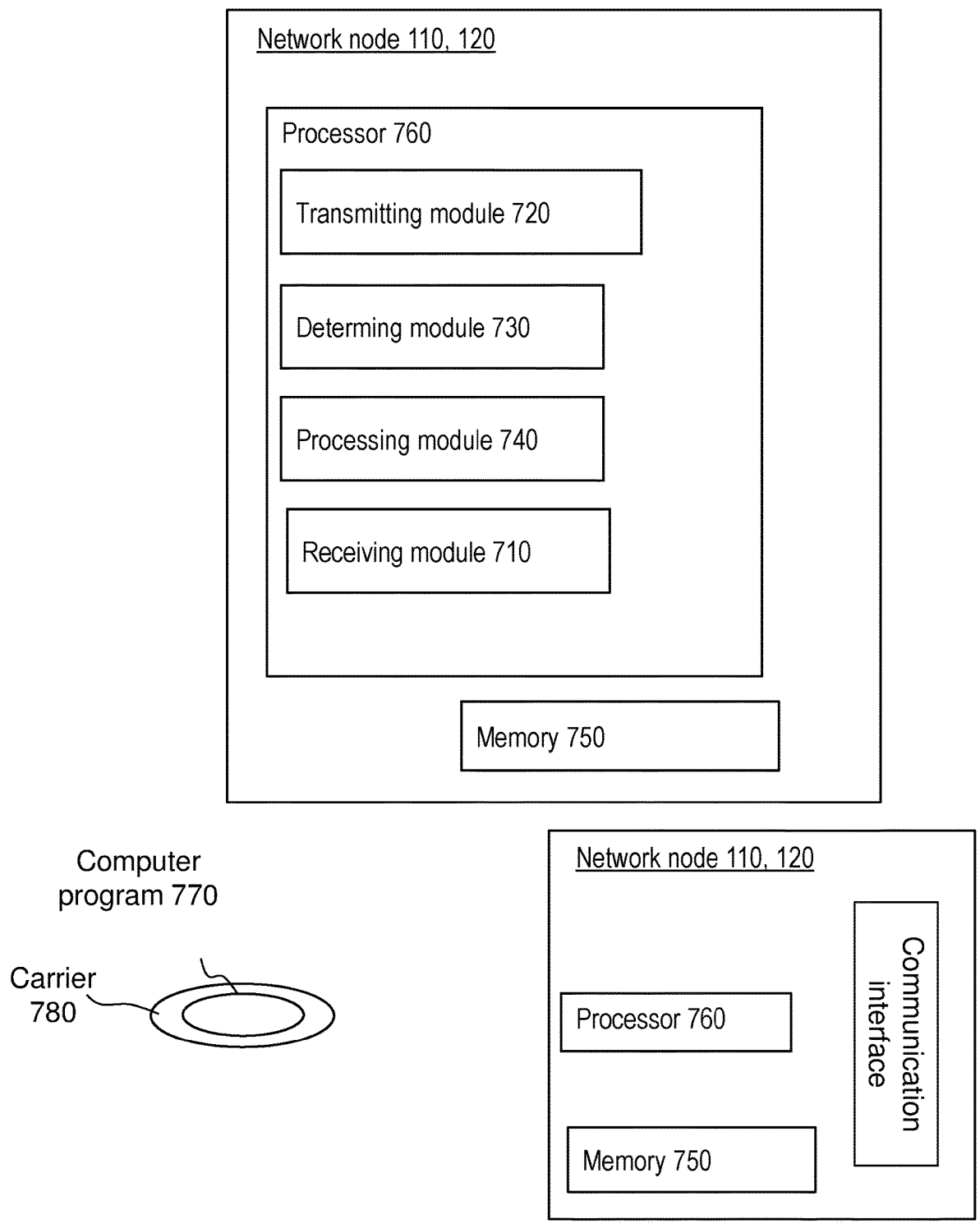
FIG. 7 is a schematic block diagram illustrating a network node.

To perform the method in the network node 110, 120 for configuring and scheduling SL resources in the wireless communication network 100 according to embodiment herein, the network node 110, 120 comprises modules as shown in FIG. 7. The network node 110, 120 comprises a receiving module 710, a transmitting module 720, a determining module 730, a processing module 740, a memory 750 etc. The network node 110, 120 is configured to perform any one of the method actions 510-542 described above.

The network node 110, 120 is configured to, e.g. by means of the determining module 730 being configured to, configure a discovery signal associated with an identity.

The network node 110, 120 is configured to, e.g. by means of the determining module 730 being configured to, configure which wireless communication devices in the number of groups to transmit and/or receive the discovery signal.

The network node 110, 120 is configured to, e.g. by means of the determining module 730 being configured to, determine if the number of groups of wireless communication devices are isolated from each other based on received signal strength on the discovery signal.

The network node 110, 120 is configured to, e.g. by means of the determining module 730 being configured to, decide whether to act according to Option 1, Option 2 or Option 3 based on whether the number of groups of wireless communication devices 130, 131, 132, 140, 141, 142 are isolated from each other or not.

Option 1: to reconfigure the number of groups of the wireless communication devices 130, 131, 132, 140, 141, 142 with a same set of SL resources if it is determined that the number of groups of wireless communication devices are isolated from each other;

Option 2: to configure the number of groups of the wireless communication devices 130, 131, 132, 140, 141, 142 with different sets of SL resources, if it is determined that the number of groups of wireless communication devices are not isolated from each other;

Option 3: to rearrange the wireless communication devices 130, 131, 132, 140, 141, 142 in the number of groups if it is determined that the number of groups of wireless communication devices are not isolated from each other.

The method according to embodiments herein may be implemented through one or more processors, such as the processor 760 in the network node 110, 120 together with computer program code for performing the functions and actions of the embodiments herein. The program code mentioned above may also be provided as a computer program product, for instance in the form of a data carrier 780 carrying computer program code 770, as shown in FIG. 6, for performing the embodiments herein when being loaded into the network node 110, 120. One such carrier may be in the form of a CD ROM disc. It is however feasible with other data carriers such as a memory stick. The computer program code may furthermore be provided as pure program code on a server or a cloud and downloaded to the network node 110, 120.

The memory 750 in the network node 110, 120 may comprise one or more memory units and may be arranged to be used to store received information, report, measurements, data, configurations and applications to perform the method herein when being executed in the network node 110, 120.

Figure 8:
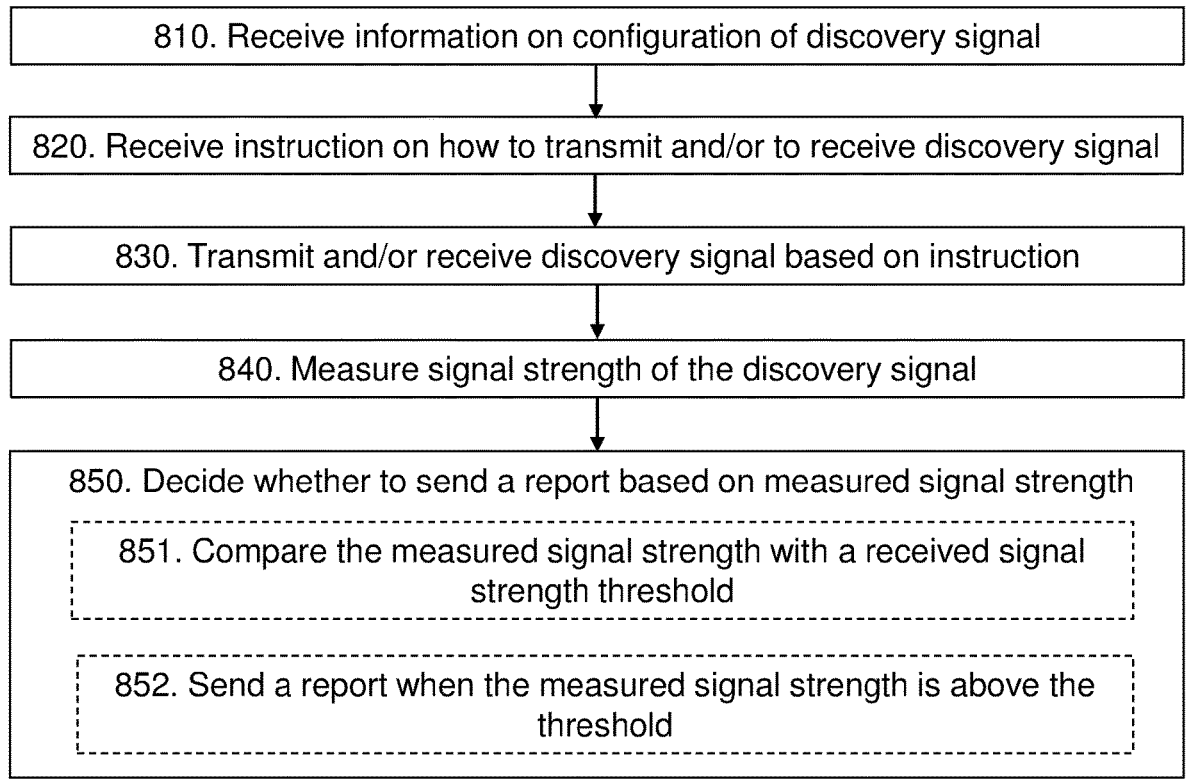
FIG. 8 is a flow chart illustrating a method performed in a wireless communication device according to embodiments herein.

According to embodiments herein, a method performed in a wireless communication device 130, 131, 132, 140, 141, 142 for monitoring interferences between a number of groups of wireless communication devices 130, 131, 132, 140, 141, 142 in a wireless communication network 100 will be described with reference to FIG. 8. The number of groups of wireless communication devices 130, 131, 132, 140, 141, 142 is established by ProSe in a cell served by the network node 110, 120. Each group of the wireless communication devices is configured by the network node 110, 120 with a different set of SL resources. The method comprises the following actions which may be performed in any suitable order.

Action 810

The wireless communication device 130, 131, 132, 140, 141, 142 receives from the network node 110, 120, information on a configuration of a discovery signal. The configuration of the discovery signal comprises time and frequency locations of the discovery signal and an identity of the discovery signal. The identity of the discovery signal includes any one of a group identity, an identity of a wireless communication device in a group, or an identity linked to the time and frequency locations of the discovery signal. The wireless communication device 130, 131, 132, 140, 141, 142 may receive the information on the configuration of the discovery signal via a dedicated RRC message or system information broadcast message from the network node 110, 120.

Action 820

The wireless communication device 130, 131, 132, 140, 141, 142 receives an instruction on how to transmit and/or to receive the discovery signal from the network node. The instruction comprises configurations on which wireless communication devices in which group to transmit and/or when to receive the discovery signal. That is the network node 110, 120 configures which wireless communication devices in which groups to send the discovery signal and it also configures which wireless communication devices in which groups, e.g. at which time and/or on what frequency etc., to listen on other groups discovery signal. The wireless communication device 130, 131, 132, 140, 141, 142 may receive the instruction via a dedicated RRC message or system information broadcast message from the network node 110, 120.

Action 830

The wireless communication device 130, 131, 132, 140, 141, 142 transmits and/or receives the discovery signal based on the received instruction.

In case the wireless communication device 130, 131, 132, 140, 141, 142 is instructed to receive the discovery signal, the method may further comprise the following actions:

Action 840

The wireless communication device 130, 131, 132, 140, 141, 142 measures a signal strength of the discovery signals transmitted by the wireless communication devices in other groups.

Action 850

The wireless communication device 130, 131, 132, 140, 141, 142 decides whether to send a report related to the discovery signal based on the measured signal strength of the discovery signal.

According some embodiments herein, the instruction may further comprise a received signal strength threshold, and the Action 850 of deciding whether to send a report related to the discovery signal based on the measured signal strength of the discovery signal may comprise the following actions:

Action 851

The wireless communication device 130, 131, 132, 140, 141, 142 compares the measured signal strength of the discovery signal with the received signal strength threshold.

Action 852

The wireless communication device 130, 131, 132, 140, 141, 142 sends a report when the measured discovery signal strength is above the threshold.

According to some embodiments herein, the wireless communication device 130, 131, 132, 140, 141, 142 may transmit the discovery signal before each usage of the SL resources. The instruction may further comprise a time period, the wireless communication device 130, 131, 132, 140, 141, 142 may average the SL resources usage and the measured discovery signal strength over the time period and send a report after the time period.

According to some embodiments herein the report may be sent to the network node 110, 120 or a coordinator in the group the wireless communication device belonging to.

According to some embodiments herein the report may comprise detected group identity and in which frequency the detected discovery signal is.

Figure 9:
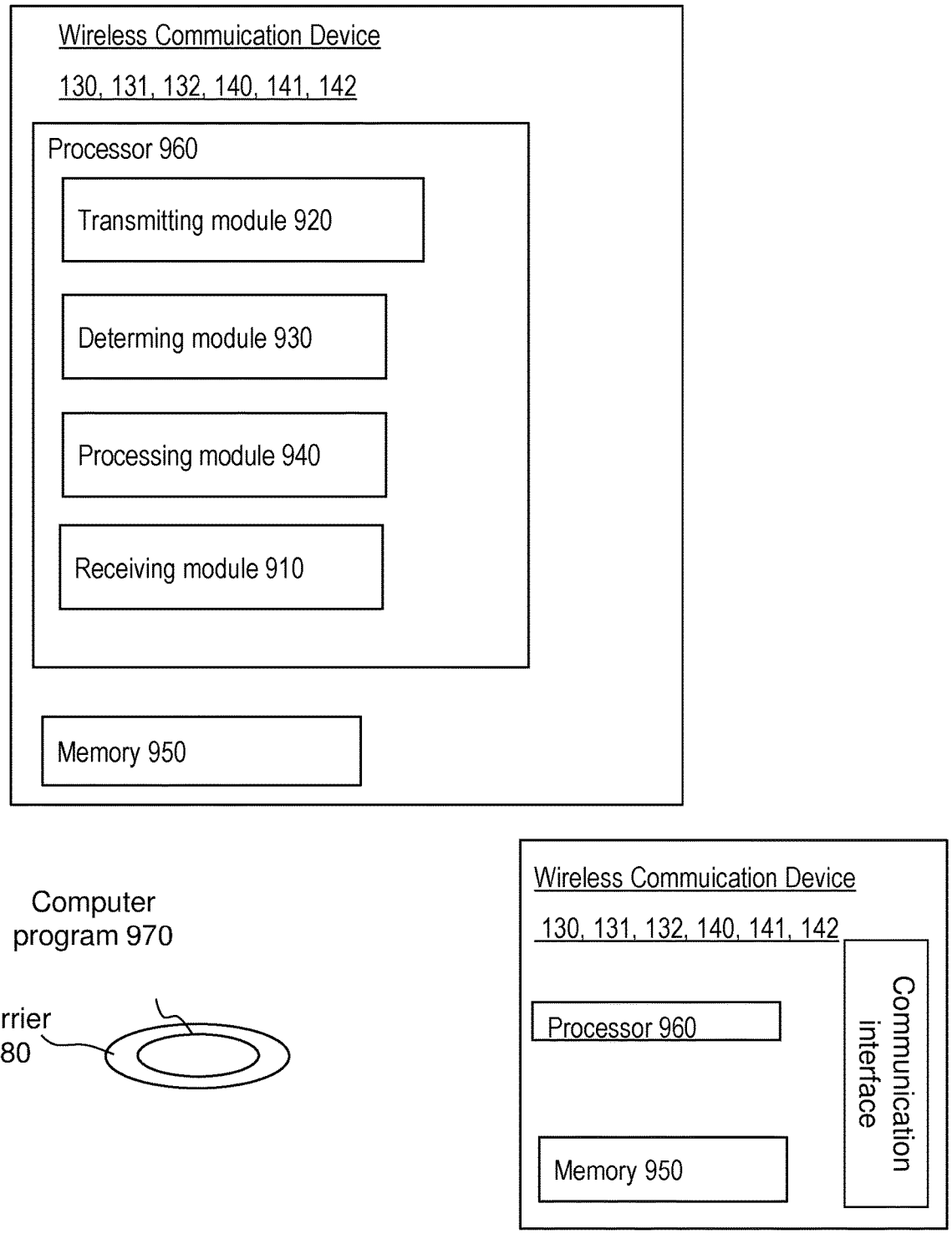
FIG. 9 is a schematic block diagram illustrating a wireless communication device.

To perform the method in the wireless communication device 130, 131, 132, 140, 141, 142 for monitoring interferences between a number of groups of wireless communication devices 130, 131, 132, 140, 141, 142 in a wireless communication network 100, the wireless communication device 130, 131, 132, 140, 141, 142 comprises modules as shown in FIG. 9. The wireless communication device 130, 131, 132, 140, 141, 142 comprises a receiving module 910, a transmitting module 920, a determining module 930, a processing module 940, a memory 950 etc. The wireless communication device 130, 131, 132, 140, 141, 142 is configured to perform any one of the method actions 810-860 described above.

The wireless communication device 130, 131, 132, 140, 141, 142 is configured to, e.g. by means of the receiving module 910 being configured to, receive from the network node 110, 120, information on a configuration of a discovery signal.

The wireless communication device 130, 131, 132, 140, 141, 142 is configured to, e.g. by means of the receiving module 910 being configured to, receive an instruction from the network node. The instruction comprises configurations on which wireless communication devices in which group to transmit and/or when to receive the discovery signal.

The wireless communication device 130, 131, 132, 140, 141, 142 is configured to, e.g. by means of the receiving module 910 and transmitting module 920 being configured to, transmit and/or receive the discovery signal based on the received instruction.

In case the wireless communication device 130, 131, 132, 140, 141, 142 is instructed to receive the discovery signal, the wireless communication device 130, 131, 132, 140, 141, 142 is further configured to, e.g. by means of the processing module 940 and determining module 930 being configured to, measure a signal strength of the discovery signals transmitted by the wireless communication devices in other groups and decide whether to send a report related to the discovery signal based on the measured signal strength of the discovery signal.

The method according to embodiments herein may be implemented through one or more processors, such as the processor 960 in the wireless communication device 130, 131, 132, 140, 141, 142 together with computer program code for performing the functions and actions of the embodiments herein. The program code mentioned above may also be provided as a computer program product, for instance in the form of a data carrier 980 carrying computer program code 970, as shown in FIG. 9, for performing the embodiments herein when being loaded into the wireless communication device 130, 131, 132, 140, 141, 142. One such carrier may be in the form of a CD ROM disc. It is however feasible with other data carriers such as a memory stick. The computer program code may furthermore be provided as pure program code on a server or a cloud and downloaded to the wireless communication device 130, 131, 132, 140, 141, 142.

The memory 950 in the wireless communication device 130, 131, 132, 140, 141, 142 may comprise one or more memory units and may be arranged to be used to store received information, report, measurements, data, configurations and applications to perform the method herein when being executed in the wireless communication device 130, 131, 132, 140, 141, 142.

To summarize, according the embodiments herein, the network node 110, 120 configures the wireless communication devices 130, 131, 132, belonging to a group to transmit discovery signals and the the wireless communication devices 140, 141, 142 belonging to other groups to monitor for the discovery signals. In case the wireless communication devices detect discovery signals from the wireless communication devices belonging to other groups, the groups are determined to not be isolated from each other, the wireless communication devices report this to the network node 110, 120. The network node 110, 120 will then configure these groups on different SL resources. In case two or more groups do not detect discovery signals from each other, the groups are determined to be isolated from each other, the network node 110, 120 may then configure these groups on the same SL resources and hereby minimize the resources used for SL transmissions in the cell. In this way, the SL resources can be configured in a more resource efficient way by reusing the same time and frequency resources for SL transmissions for isolated groups within the same cell.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method performed in a network node for configuring sidelink (SL) resources in a wireless communication network comprising a number of groups of wireless communication devices in a cell served by the network node, wherein the method comprises:

configuring a discovery signal associated with an identity;

configuring which wireless communication devices in which groups to transmit and/or receive the configured discovery signal, wherein each group of the wireless communication devices is configured with a different set of SL resources;

determining whether the number of groups of wireless communication devices are isolated from each other based on one or more reports related to the discovery signal; and performing one of the following based on the determination of whether the number of groups of wireless communication devices are isolated from each other:

reconfiguring the number of groups of the wireless communication devices (with a same set of SL resources, when it is determined that the number of groups of wireless communication devices are isolated from each other;

configuring the number of groups of the wireless communication devices with different sets of SL resources, when it is determined that the number of groups of wireless communication devices are not isolated from each other; or rearranging the wireless communication devices in the number of groups of wireless communication devices, when it is determined that the number of groups of wireless communication devices are not isolated from each other.

2. The method according to claim 1, wherein determining whether the number of groups of wireless communication devices are isolated from each other based on a report related to the discovery signal comprises:

checking whether a report related to the discovery signal is received from any of the wireless communication devices in the number of groups of wireless communication devices, and determining that the number of groups of wireless communication devices are isolated from each other when any one of the following applies:

no report is received from any of the wireless communication devices in the number of groups within a time period, received reports from the wireless communication devices indicate that the wireless communication devices in the number of groups do not detect the discovery signal, or received reports from the wireless communication devices indicate that the received signal strength on the discovery signal fulfills a condition.

3. The method according to claim 1, wherein rearranging the wireless communication devices in the number of groups comprises:

removing a wireless communication device from its group when the discovery signal transmitted by this wireless communication device is detected by any of the wireless communication devices in other groups; or reallocating a wireless communication device in a first group to a third group when the discovery signal transmitted by this wireless communication device is detected by any of the wireless communication devices in a second group.

4. The method according to claim 1, wherein configuring which wireless communication devices in the number of groups to transmit the discovery signal comprises configuring one of the following to transmit the discovery signal:

all the wireless communication devices in a group;
a subset of the wireless communication devices in a group;
a single wireless communication device in a group.

5. The method according to claim 1, wherein configuring a discovery signal associated with an identity comprises:

configuring transmission time and frequency locations for the discovery signal;

configuring one of the following identities for identifying the discovery signal: a group identity, an identity of a wireless communication device in a group, or an identity linked to the time and frequency locations of the discovery signal; and sending the information on the time and frequency locations of the discovery signal to the wireless communication devices in the number of groups.

6. The method according to claim 5, wherein configuring a discovery signal associated with an identity comprises any one of the following:

configuring a Sidelink Primary Synchronization Signal (S-PSS) or a Sidelink Secondary Synchronization Signal (S-SSS) with a group identity as a discovery signal;

configuring a discovery signal with an unique resource block for each group, wherein a group identity is represented by any one of the following: a time-shift of the discovery signal, a frequency of the discovery signal, or a frequency-shift of the discovery signal; or configuring a side-link control information (SCI) signal as a discovery signal, wherein a source identity of the SCI signal represents a group identity.

7. The method according to claim 1, further comprising configuring a received signal strength threshold for the wireless communication devices such that the wireless communication devices only send a report when the measured discovery signal strength is above the threshold.

8. The method according to claim 1, further comprising:

configuring the wireless communication devices to transmit the discovery signal before each usage of the SL resources; and configuring a time period during which the wireless communication devices should average the SL resources usage and the detected discovery signal strength and subsequently send a report to the network node after the configured time period.

9. The method according to claim 1, wherein each report related to a discovery signal comprises a detected group identity and a frequency at which a discovery signal was detected.

10. The method according to claim 1, wherein:

each of the one or more reports is received from a wireless communication device identified as a coordinator for a group; and each report from a coordinator is an aggregation of reports from all or some of the wireless communication devices within the group of the coordinator.

11. A network node arranged to configure sidelink (SL) resources in a wireless communication network that comprises a number of groups of wireless communication devices in a cell served by the network node, wherein the network node comprises a processor configured to execute computer program code that causes the network node to:

configure a discovery signal associated with an identity;

configure which wireless communication devices in which groups to transmit and/or receive the configured discovery signal, wherein each group of the wireless communication devices is configured with a different set of SL resources;

determine whether the number of groups of wireless communication devices are isolated from each other based on one or more reports related to the discovery signal; and perform one of the following based on the determination of whether the number of groups of wireless communication devices are isolated from each other:

reconfigure the number of groups of the wireless communication devices (with a same set of SL resources, when it is determined that the number of groups of wireless communication devices are isolated from each other;

configure the number of groups of the wireless communication devices with different sets of SL resources, when it is determined that the number of groups of wireless communication devices are not isolated from each other; or rearrange the wireless communication devices in the number of groups of wireless communication devices, when it is determined that the number of groups of wireless communication devices are not isolated from each other.

12. The network node according to claim 11, wherein execution of the computer program code by the processor causes the network node to determine whether the number of groups of wireless communication devices are isolated from each other based on a report related to the discovery signal based on:
checking whether a report related to the discovery signal is received from any of the wireless communication devices in the number of groups of wireless communication devices, and
determining that the number of groups of wireless communication devices are isolated from each other when any one of the following applies:
no report is received from any of the wireless communication devices in the number of groups within a time period,
received reports from the wireless communication devices indicate that the wireless communication devices in the number of groups do not detect the discovery signal, or
received reports from the wireless communication devices indicate that the received signal strength on the discovery signal fulfills a condition.

13. The network node according to claim 11, wherein execution of the computer program code by the processor causes the network node to rearrange the wireless communication devices in the number of groups based on:
removing a wireless communication device from its group when the discovery signal transmitted by this wireless communication device is detected by any of the wireless communication devices in other groups; or
reallocating a wireless communication device in a first group to a third group when the discovery signal transmitted by this wireless communication device is detected by any of the wireless communication devices in a second group.

14. A method performed in a wireless communication device for monitoring sidelink (SL) interference between a number of groups of wireless communication devices in a cell served by a network node in a wireless communication network, wherein each group of the wireless communication devices is configured by the network node with a different set of SL resources, wherein the method comprises:
receiving from the network node a configuration of a discovery signal, wherein:
the configuration of the discovery signal includes the following: time and frequency locations of the discovery signal, and an identity of the discovery signal; and
the identity of the discovery signal includes any one of the following: a group identity, an identity of a wireless communication device in a group, or an identity linked to the time and frequency locations of the discovery signal;
receiving from the network node an instruction indicating one or more of the following:
configurations for which wireless communication devices in which group to transmit the discovery signal, and when to receive the discovery signal;
transmitting and/or receiving the discovery signal based on the received instruction; and
performing the following operations when the received instruction indicates when to receive the discovery signal:
measuring a signal strength of discovery signals transmitted by the wireless communication devices in other groups; and
determining whether to send a report related to the discovery signal based on the measured signal strength of the discovery signal.

15. The method according to claim 14, wherein the instruction also indicates a received signal strength threshold, and determining whether to send a report related to the discovery signal based on the measured signal strength of the discovery signal comprises:
comparing the measured signal strength of the discovery signal with the signal strength threshold; and
sending a report when the measured discovery signal strength is above the signal strength threshold.

16. The method according to claim 15, wherein the report is sent to one of the following: the network node, or a coordinator wireless communication device of the group to which the wireless communication device belongs.

17. The method according to claim 15, wherein the report comprises a detected group identity and a frequency at which a discovery signal was detected.

18. The method according to claim 14, wherein transmitting and/or receiving the discovery signal based on the received instruction comprises transmitting the discovery signal before each usage of the SL resources.

19. The method according to claim 18, wherein when the received instruction indicates when to receive the discovery signal, the received instruction also indicates a time period and the method further comprises:
averaging SL resources usage and the measured discovery signal strength over the time period; and
sending a report after the time period.

20. A wireless communication device configured to monitor sidelink (SL) interference between a number of groups of wireless communication devices in a wireless communication network, wherein the wireless communication device comprises a processor configured to execute computer program code that causes the wireless communication device to perform operations corresponding to the method according to claim 14.

* * * * *